No. 865,522. PATENTED SEPT. 10, 1907.
W. R. PARK.
CARBURETER.
APPLICATION FILED FEB. 23, 1906.

5 SHEETS—SHEET 1.

WITNESSES: INVENTOR

No. 865,522. PATENTED SEPT. 10, 1907.
W. R. PARK.
CARBURETER.
APPLICATION FILED FEB. 23, 1906.

5 SHEETS—SHEET 2.

WITNESSES=

INVENTOR=
William R. Park
By Roberts & Mitchell
Attorneys

No. 865,522.

PATENTED SEPT. 10, 1907.

W. R. PARK.
CARBURETER.
APPLICATION FILED FEB. 23, 1906.

5 SHEETS—SHEET 4.

WITNESSES:
Josephine H. Ryan
Margaret A. Danaher

INVENTOR:
William R. Park
By Roberts W. Mitchell
Attorneys

No. 865,522. PATENTED SEPT. 10, 1907.
W. R. PARK.
CARBURETER.
APPLICATION FILED FEB. 23, 1906.
5 SHEETS—SHEET 5.
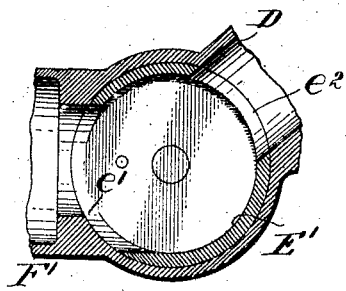
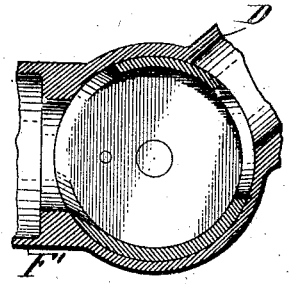
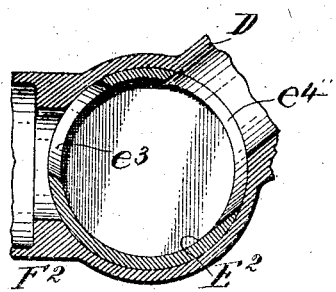
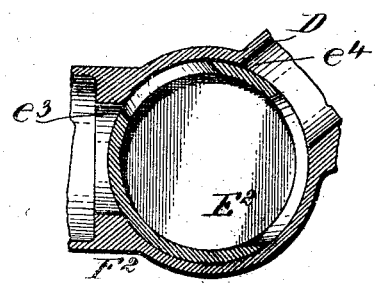
Fig.10. Fig.11.

UNITED STATES PATENT OFFICE.

WILLIAM R. PARK, OF TAUNTON, MASSACHUSETTS.

CARBURETER.

No. 865,522.     Specification of Letters Patent.     Patented Sept. 10, 1907.

Application filed February 23, 1906. Serial No. 302,362.

*To all whom it may concern:*

Be it known that I, WILLIAM R. PARK, a citizen of the United States, and a resident of Taunton, in the county of Bristol and State of Massachusetts, have invented new and useful Improvements in Carbureters, of which the following is a specification.

My invention relates to carbureters for internal combustion engines which employ a fuel mixture of air and volatilized hydrocarbon, and consists in certain improvements in structure whereof the object is to maintain a correct proportion of the fuel ingredients delivered to the engine under changing conditions and to accomplish this result by an automatic regulation of pneumatic pressures without the aid of complicated mechanical self-adjusting devices. I attain these objects by so constructing the air and gaseous-mixture passages of the carbureter that no matter what the position of the throttling valves may be, the pneumatic pressure in the mixing chamber, which contains the liquid fuel spraying nozzle, is very nearly constant, its variation from the constant being so slight that for all practical purposes the approximation to constancy of pneumatic pressure may be considered perfect. By establishing a constant pneumatic pressure at the spray nozzle which is the critical point in the apparatus, I am enabled to control with certainty the amount of liquid fuel admitted to the air passages of the carbureter and can, therefore, establish either a constant or a regularly graded proportion of liquid hydrocarbon to air in determining the mixture which shall pass to the cylinders of the engine. Moreover, this maintenance of constant pneumatic pressure and determination of the proportion of hydrocarbon fuel to air, is secured in my carbureter without the employment of delicate moving parts and with only that sure and simple adjustment which may be secured by the mere movement of valves.

Figure 1:
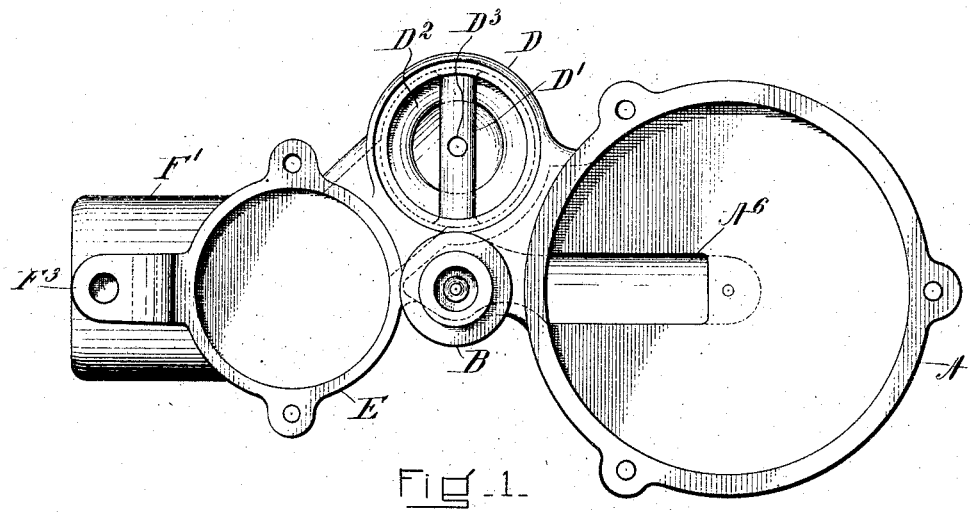
Figure 2:
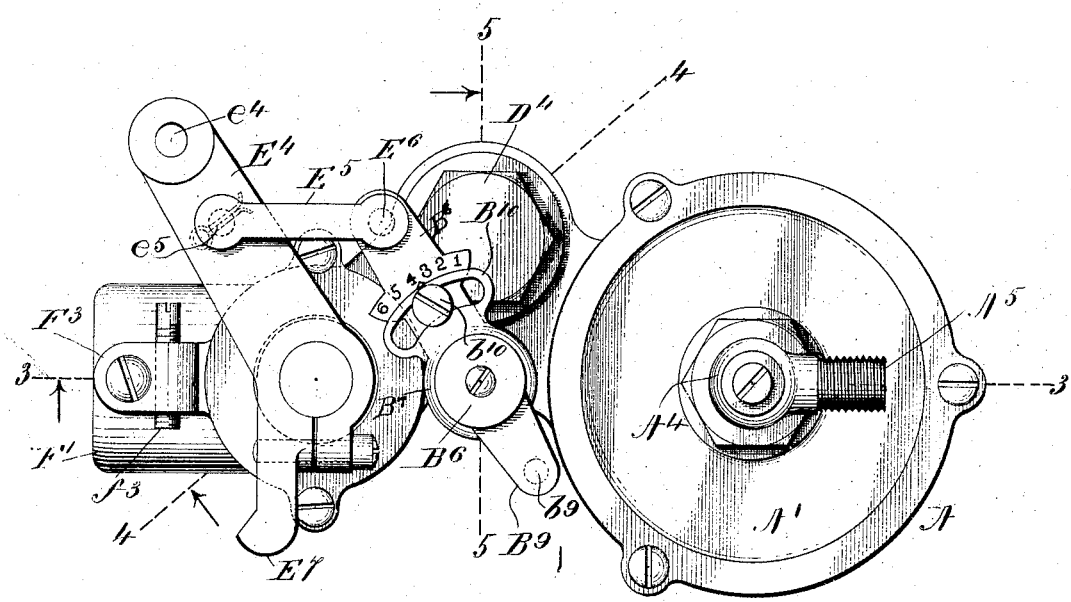
Figure 3:
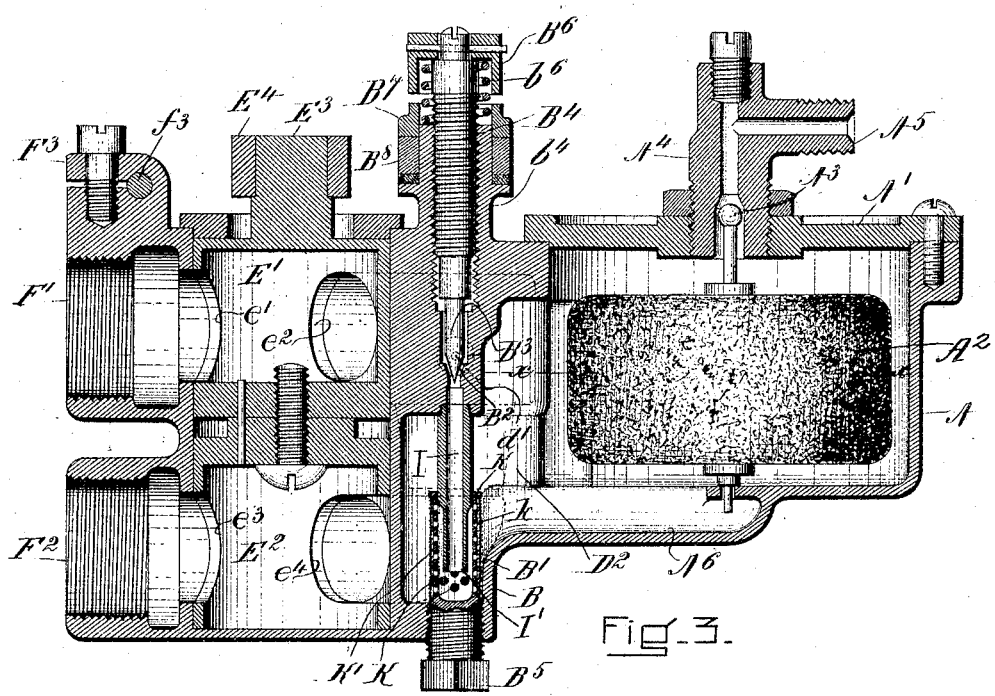
Figure 4:
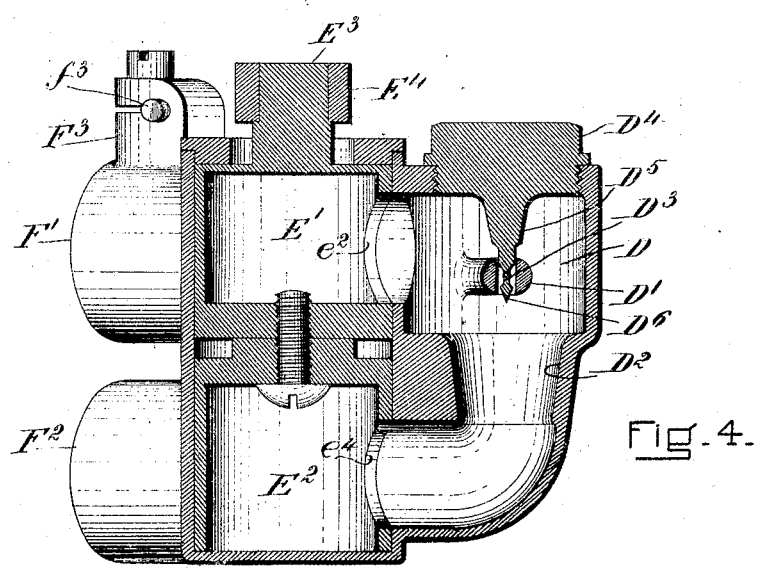
Figure 5:
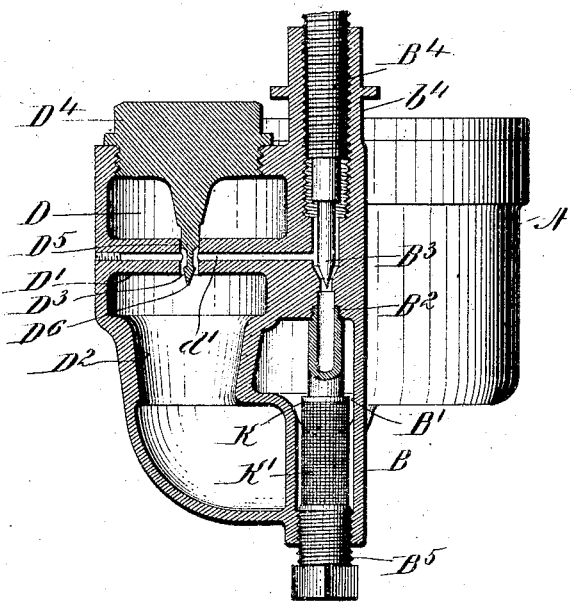
Figures 6, 7, 8:
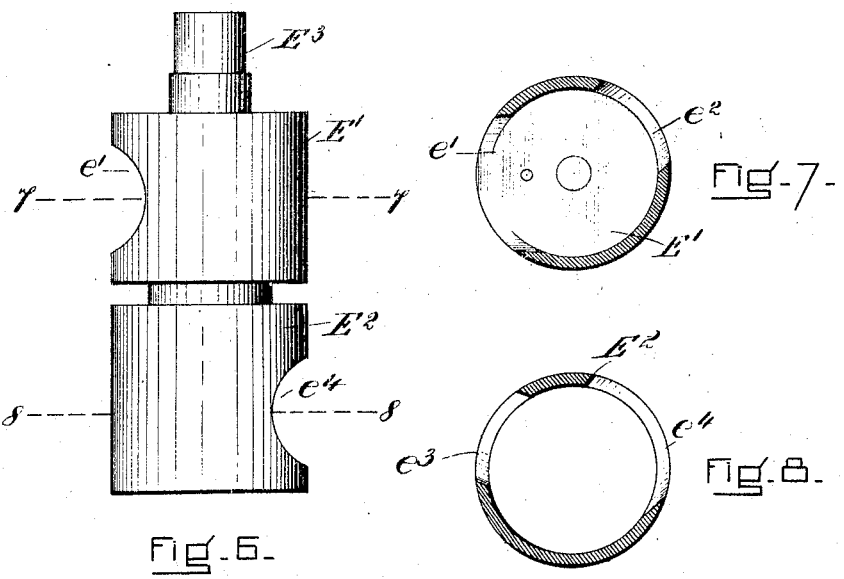
Figure 9:
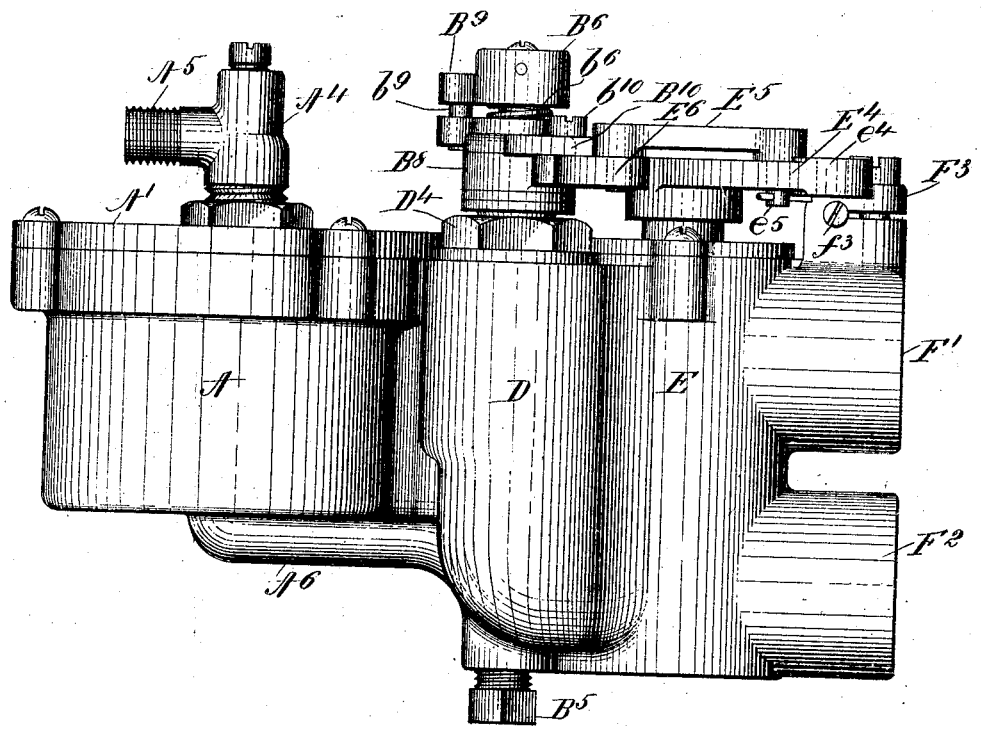
Figure 12:
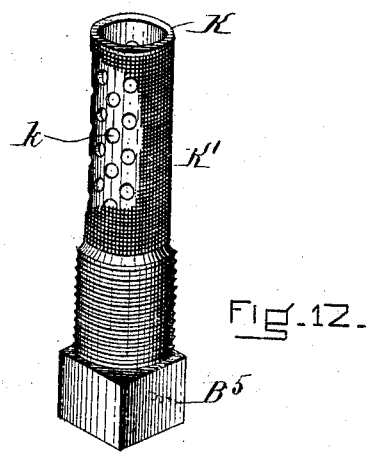

In the drawings hereto annexed which illustrate embodiments of my invention and improvements,—Figure 1 is a top plan view of the casing of a carbureter with the covers and valve operating parts thereof removed; Fig. 2 is a top plan view of the carbureter in its entirety; Fig. 3 is a vertical section of Fig. 2 through the line 3—3; Fig. 4 is a vertical section of Fig. 2 along the line 4—4; Fig. 5 is a vertical section of Fig. 2 along the line 5—5; Fig. 6 is a vertical elevation of the air and mixture throttle valve removed from the casing; Fig. 7 is a cross section of Fig. 6 along the line 7—7; Fig. 8 is a cross section of Fig. 7 along the line 8—8; Fig. 9 is an elevation of the carbureter as it would appear when viewed from a point at the upper right hand side of Fig. 2; Fig. 10 is a sectional view of the air and mixture throttle valve in its upper and lower parts with the air and mixture passages wide open; Fig. 11 is a similar view of said throttle valve and adjacent parts when the throttle is closed; and Fig. 12 is a detail, showing the fuel strainer in perspective.

The carbureter casing is as usual cast in a single piece of brass, bronze or other incorrodible metal and has the float chamber A, the liquid fuel valve chamber B, the mixing chamber D and the throttle valve chamber E. Within the float chamber A there is mounted in bearings, so as to slide vertically in the usual way, the float $A^2$ which carries and controls the valve $A^3$ which seats in the pipe union $A^4$ to which gasolene, alcohol or other volatile liquid fuel is delivered through the pipe $A^5$. The chamber A communicates with the interior of the chamber B, the channel $A^6$ being provided for the purpose of conducting the liquid fuel from one chamber to the other. The volatile liquid hydrocarbon supplied by the float controlled valve passes through the lower portion $B'$ of the chamber B to the liquid level indicated by line $x$—$x$ of Fig. 3, which is the level predetermined by the adjustment of the float. This level may obviously be varied by adjustment as variations in the fuel quality may indicate. The sinuous path the fuel is thus compelled to pass provides a safe seal and prevents the possible entrance of air into the fuel current. This supply of liquid fuel is controlled by the valve $B^3$ which seats over and controls the fuel passage $B^2$. The conduit through which the liquid hydrocarbon fuel flows from the well $B'$ to the regulating valve $B^3$ is the pipe I which is reduced in its external diameter at $I'$. The drainer plug $B^5$ has mounted upon it or preferably as a part integral with it, the sleeve K perforated with a number of holes $k$. Around the outside of the sleeve K there is wrapped and soldered a fine wire screen $K'$ which serves to arrest any particles of foreign matter which may have entered the carbureter. The upper end of the sleeve K fits snugly upon the tube I whereof the reduced portion $I'$ occupies the space within the said sleeve. Whenever it is desired to inspect the strainer or to clean it, it may be removed by simply unscrewing the plug $B^5$. The valve $B^3$ is secured to or is an integral part of a screw threaded stem $B^4$ which turns in a suitably threaded standard $b^4$ which is cast as an integral portion of the carbureter casing. The mixing chamber of the carbureter is shown in cross section in Fig. 5. Across the upper part of this mixing chamber extends the tubular bridge $D'$, the interior bore $d'$ of which communicates with the valve controlled fuel passage $B^2$. The tubular bridge $D'$ is bored through vertically at $D^3$ so as to admit the spraying stem $D^5$ whereof the head $D^6$ passes into the vertical bore $D^3$ so as to form with its walls an annular spraying orifice or nozzle. The stem $D^5$ is secured to or formed integral with the threaded plug $D^4$ which is inserted and screwed to its seat from above. Below the spraying orifice formed by the head $D^6$ and vertical bore $D^3$, there is formed the downwardly tapering combining tube $D^2$ into and through which the mixture of air and volatilized hydrocarbon is drawn on its way to the engine cylinders. The double valve $E'$ $E^2$ is mounted and fitted to turn in the vertical cylindrical valve chamber E. The double valve is shown as made in two parts which are secured together. It might, however, be made as one integral piece with the two distinct valve portions above and below. In the upper portion E' there are formed the openings e', e² which communicate respectively with the air inlet F' and the mixing chamber D, and the lower valve section E² has ports or openings e³, e⁴ which communicate respectively with the mixture outlet F² and with the combining tube D² of the mixing chamber D. The stem E³ has secured to it the crank arm E⁴ which, by means of a suitable connection at e⁴ may be controlled by the throttle operating devices in the usual way.

The air inlet F', the chamber in the upper part of the valve, E', mixing chamber D, the chamber in the lower part of the valve, E², the outlet F² constitute collectively a gas conduit into which air is drawn, in which air and fuel are mixed, and from which the mixture of air and gaseous fuel is withdrawn.

Reference to Figs. 6, 7, 8, 10 and 11 will make clear the construction and function of the double valve E', E² in its relation to the mixing chamber and volatile liquid supply. The port e' is considerably larger than the port e² and the port e⁴ is considerably larger than the port e³. When the double valve E is closed so as to throttle the supply of fuel and air mixture to the engine, the several ports stand as shown in Fig. 11. The upper valve opening e², coöperating with the adjacent wall of the carbureter casing determines the minimum cross sectional area of the air inlet passage to the carbureter, while the valve port e³ of the lower portion E² determines the minimum cross sectional area of the mixture outlet through which mixed air and fuel pass to the engine. These ports are so proportioned that at the extreme throttling position when a practical minimum of explosive mixture is fed to the cylinder, the minimum cross sectional area of the mixture passage is decidedly less than the minimum cross sectional area of the air supply passage; that is to say, the conduit leading from the mixing chamber of the carbureter is, in effect, much smaller than the conduit leading to the mixing chamber. As the throttle valve E', E² is opened, the ports e² and e³ coöperating with the adjacent portions of the carbureter casing afford a larger and larger passage for the gases inducted into the engine, until in the opening of the throttle valve the condition shown in Fig. 10 is arrived at when the port openings are all at their maximum and afford the freest possible passage of gases to the engine. In the position of valve shown in Fig. 10 the preponderance of minimum cross section of air inlet over the minimum cross section of mixture outlet has largely disappeared, the two passages being nearly of the same size. As the valve is closed gradually towards the position shown in Fig. 11, the effective preponderance of air inlet cross sectional area over mixture outlet cross sectional area increases gradually and progressively.

The result of the above described arrangement is to maintain in the mixing chamber D a substantially constant pneumatic pressure. For a given engine the transmitting capacity of the gas conduits of the carbureter is determined with reference to the cylinder space, so that with these passages open as wide as may be, the pneumatic pressure in the mixing chamber of the carbureter is sufficient to insure an effective draft upon the liquid fuel supply from the float chamber. When this condition of full and free opening is established the problem of adjustment and graduation of conditions to suit the engine when running under the throttle, remains to be considered and solved. When the engine is running with a full supply of explosive mixture, if the relation of effective cross sectional area of the liquid fuel passage to the cross sectional area of the air inlet be fixed at say 1 to 400 and at this ratio the desired proportions of gaseous ingredients in the explosive mixture are fed to the engine, it will be mechanically fairly easy to preserve this relationship between the liquid fuel and air inlet areas and if the draft which determines the effect of liquid fuel at the spraying nozzle remain substantially constant, the mixture proportion will be preserved throughout all positions of the throttle valve, or may be accurately and definitely graded to insure maximum explosive efficiency under all conditions.

The effect of so proportioning the throttle valve openings that the preponderance in cross sectional area of the air inlet over the mixture outlet increases gradually as the throttle valve is closed is to confine the extreme variations in pneumatic pressure to those parts of the gas passages which lie between the mixture outlet from the carbureter and the engine cylinders, the relatively large area of the air inlet being sufficient to supply all the demands for more air which can be made upon it by the restricted area of the outlet without decrease of pneumatic pressure in the mixing chamber.

I have determined by experiments and practice that a ratio of air inlet area to mixture outlet area of 4 to 1 at the extreme throttling position of the valve will insure the maintenance of the same pneumatic pressure in the mixing chamber as an area ratio of about 6 to 5 with the throttle valve wide open, and that by graduating this ratio from one extreme to the other steadily as the throttle valve is closed, preserves the pneumatic pressure in the mixing chamber substantially constant under all conditions. Having by this means secured a constant vacuum draft upon the liquid fuel spray nozzle under all of the conditions of throttle valve opening, I am enabled to maintain the same proportions of fuel to air in the combustible mixture whether the throttle valve be opened or closed. If, for instance, it be determined that the proper mixture would be obtained by having the liquid fuel valve opening one four-hundredth part of the area of the air inlet opening when the throttle valve is wide open, this proportion may be preserved by so mounting and controlling the liquid valve that it shall close and diminish the area of the liquid opening in constant proportion to the diminution of the air supply opening. On the other hand, if it be desired to make a progressive change in the fuel value of the mixture as the total quantity thereof admitted to the engine is reduced, the parts to which the liquid valve is secured may be so proportioned that the liquid valve while operating to close or open by even graduations shall gradually change the proportion between liquid admission valve area and air admission area. Indeed it is usually desirable to make such progressively graduated differences in the specific fuel value of the mixture as the engine is throttled for the reason that the proportion of combustion-products contained in the cylinder clearances becomes greater as the throttle valve is closed, and to compensate for the increased proportion of the combustion-products it is well to increase the specific fuel value of the mixture entrained to the cylinder. The form of mechanism illustrated in the drawings which accomplishes this result is shown in Figs. 2, 3 and 9. The valve $B^3$ is mounted upon the screw threaded stem $B^4$. The cap $B^6$ is fastened rigidly to the top of the said screw-stem and confines the spring $b^6$ which seats in the cap $B^6$ and upon the top of the standard $b^4$. The arm $B^6$ extends from the cap $B^6$ and carries upon its outer end the pin $b^9$ which enters a hole made for the purpose in the end of the arm $B^7$. This arm $B^7$ is sleeved to turn upon the standard $b^4$ and below it, likewise sleeved upon the said standard, there is placed the crank $B^8$. An extension $B^{10}$ of the arm $B^7$ is slotted as shown in Fig. 2 and the screw $b^{10}$ which is threaded into the crank arm $B^8$ passes through this slot and secures the crank $B^8$ and arm $B^{10}$ in any desired position or relation within the scope of adjustment permitted by this slot in the extension $B^{10}$. The outer end of the crank $B^8$ is provided with a hole which admits the pin $E^6$ in one end of the link $E^5$, the other end of said link being similarly pinned to the crank $E^4$. Thus as the crank $E^4$ is operated to open or close the double throttle valve $E'$ $E^2$, by means of the connections through link $E^5$, crank $B^8$, arms $B^7$ and $B^9$ the screw threaded stem $B^4$ is turned and the valve $B^3$ opened or closed. It will now be perceived that by determining the pitch of the thread of the screw $B^4$ one may also determine the rate of change in the ratio between the fuel inlet opening and the air inlet opening. I have found in practice, for instance, that a proportion of fuel inlet area to air inlet area of 1 to 400 yields admirable results when the engine is running at full power and the throttle valve is not employed to restrict the air supply, but that the same engine will run with best economy when throttled to the extreme point if this ratio be then changed to about 1 to 350. If, therefore, a given pitch of the screw $B^4$ had been calculated and ascertained to preserve this ratio without variation, the provision of a screw $B^4$ of slightly greater pitch will cause the ratio to vary as desired and above suggested.

In order to adjust the initial opening of the liquid fuel valve, I have provided the devices hereinbefore alluded to, namely, the quadrant slot at $B^{10}$ in the arm $B^7$ and the adjusting screw $b^{10}$. By slackening this screw $b^{10}$ the valve stem $B^4$ may be turned within the limits of the slot and the initial opening of the valve varied to suit the conditions, the parts being set by turning down the screw $b^{10}$. The office of the spring $b^6$ (see Fig. 3) is to take up all back lash and hold the valve stem firmly to its bearing.

The spray nozzle formed, in the specific instance illustrated in the drawings, by the perforation $D^3$ in the bridge $D'$ and the stem head $D^6$, is directed downward; this arrangement in my estimation being superior in its effect to one wherein the spray nozzle delivers its contents upward. The assemblage of the parts is made easy by securing or forming the stem $D^5$ upon the screw threaded cap $D^4$ which may be inserted from above the stem $D^5$ and passed into the aperture $D^3$ so that the head $D^6$ forms a suitable annular spray nozzle in coöperation with the sides of the vertical aperture.

In order to effect a thorough intermixture of the volatilized fuel and the air, I form the mixing chamber casing so as to provide a tapering and preferably conical combining tube $D^2$ immediately below the spray nozzle. This tapered combining tube, which should be concentric with the spray nozzle axis, materially assists in preserving a steady entrainment of the mixed gases from the carbureter to the engine.

The throw of the throttle valve and the articulately connected fuel valve may be suitably adjusted by the screw $f^3$ set in the block or standard $F^3$ so as to make contact alternately with the crank arm $E^4$ or the ear $E^7$.

Claims.

1. In a carbureter, a gas conduit comprising an air inlet mixing chamber and mixture outlet, a spray nozzle, a liquid fuel passage to the spray nozzle, a fuel valve, and throttle valves controlling the air inlet and mixture outlet, respectively, and means to open and close the two throttle valves and the fuel valve simultaneously, and means to increase gradually the ratio of fuel valve opening to air valve opening as the air valve opening decreases.

2. In a carbureter, a gas conduit comprising an air inlet mixing chamber and mixture outlet, a spray nozzle, a liquid fuel passage to the spray nozzle, a fuel valve, and throttle valves controlling the air inlet and mixture outlet, respectively, and means to open and close the two throttle valves and the fuel valve simultaneously, the effective sectional area of the air inlet being greater at all normal working positions of the throttle valves than the effective sectional area of the mixture outlet, and means to increase gradually the ratio of fuel valve opening to air valve opening as the air valve opening decreases.

3. In a carbureter, a gas conduit comprising an air inlet mixing chamber and mixture outlet, a spray nozzle, a liquid fuel passage to the spray nozzle, and throttle valves controlling the air inlet and mixture outlet, respectively, means to open or close said valves simultaneously, the said valves proportioned to afford a greater effective valve port area of the inlet than of the outlet, at all normal working positions of the valves, and to decrease the proportionate preponderance of inlet over outlet as both increase.

4. In a carbureter, a gas conduit comprising an air inlet mixing chamber and mixture outlet, a spray-nozzle, a liquid fuel passage to the spray-nozzle, a fuel-valve, throttle valves to control the air inlet and mixture outlet, respectively, means to open and close the two throttle valves and the fuel valve simultaneously, the effective sectional area of the air inlet greater at all normal working positions of the throttle valves than the effective sectional area of the mixture outlet, the throttle valves proportioned to decrease the proportionate preponderance of inlet area over outlet area as both increase, and means to increase gradually the ratio of fuel valve opening to air valve opening as the air valve opening decreases.

5. In a carbureter, a gas conduit comprising a mixing chamber, an air inlet communicating with the upper end thereof, and a mixture outlet communicating with the lower end, a liquid fuel pipe bridging the gas conduit above the mixing chamber, an aperture in said liquid fuel pipe and a spray nozzle in said aperture, directed downward toward the mixing chamber.

6. In a carbureter, the combination of a liquid fuel valve, a conduit controlled thereby, a vertical tubular mixing chamber, an air inlet to the top thereof and a mixture outlet from the bottom thereof, a horizontal tube extending into the mixing chamber midway between the air inlet and mixture outlet, the bore of said tube communicating with the valve controlled liquid fuel conduit, said tube also transversely and vertically perforated, to admit the insertion of a spraying device from the top thereof, and the spraying device, to deliver fuel in a downward spray into the mixing chamber.

7. In a carbureter, the combination of a fuel conduit, an air inlet, a mixing chamber, a mixture outlet, a throttle valve having ports to control both the air inlet and mixture outlet, means to open and close said ports simultaneously, the effective port area of the air inlet being greater than that of the mixture outlet at all working positions of the valve, a spray nozzle to deliver fuel to the mixing chamber, a fuel valve, means to graduate the opening thereof, connections between said fuel valve operating means and the air and mixture throttle valve, to open and close them simultaneously and to maintain a predetermined rate of change in the ratio between the effective port areas of the fuel valve and air valve.

Signed by me at Boston, Massachusetts, this sixteenth day of February, 1906.

WILLIAM R. PARK.

Witnesses:
ERNEST B. CROCKER,
JOSEPH T. BRENNAN.